(12) United States Patent
Ray et al.

(10) Patent No.: US 6,957,305 B2
(45) Date of Patent: Oct. 18, 2005

(54) DATA STREAMING MECHANISM IN A MICROPROCESSOR

(75) Inventors: David Scott Ray, Georgetown, TX (US); David J. Shippy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 10/232,248

(22) Filed: Aug. 29, 2002

(65) Prior Publication Data

US 2004/0044847 A1 Mar. 4, 2004

(51) Int. Cl.[7] .............................................. G06F 12/00
(52) U.S. Cl. ...................... 711/137; 711/118; 711/125; 711/138; 711/204; 712/205; 712/206; 712/207
(58) Field of Search ................................ 711/118, 125, 711/137, 138, 204; 712/205, 206, 207

(56) References Cited

U.S. PATENT DOCUMENTS

| | | | |
|---|---|---|---|
| 5,870,599 A | | 2/1999 | Hinton et al. |
| 5,933,835 A | | 8/1999 | Adams et al. |
| 5,948,095 A | | 9/1999 | Arora et al. |
| 6,073,215 A | * | 6/2000 | Snyder ........................ 711/137 |
| 6,119,203 A | | 9/2000 | Snyder et al. |
| 6,128,703 A | | 10/2000 | Bourekas et al. |
| 6,202,130 B1 | | 3/2001 | Scales, III et al. |
| 6,253,306 B1 | | 6/2001 | Ben-Meir et al. |
| 6,499,116 B1 | * | 12/2002 | Roth et al. ..................... 714/39 |
| 6,748,496 B1 | * | 6/2004 | Scarpino ..................... 711/137 |
| 2003/0204673 A1 | * | 10/2003 | Venkumahanti et al. .... 711/137 |

FOREIGN PATENT DOCUMENTS

| | | |
|---|---|---|
| CA | 2283044 A1 | 4/2000 |
| WO | WO 00/50998 A1 | 8/2000 |

OTHER PUBLICATIONS

Portable, Modular transactions for UNIX, 1992.*
"Initialization of I/O Subsystems According to Cache Techniques"; *IBM Technical Disclosure Bulletin*; Feb. 1994; vol. 37; No. 02B; pp. 365–366; Boca Raton, Florida.
Ki, A. and Knowles, AE; "Stride Prefetching for the Secondary Data Cache"; Journal of Systems Architecture; *IEEE*; Oct. 2000; vol. 46, No. 12; pp. 1093–1102; Netherlands.

* cited by examiner

*Primary Examiner*—Donald Sparks
*Assistant Examiner*—Ngoc V. Dinh
(74) *Attorney, Agent, or Firm*—Carr LLP; Diana R. Gerhardt

(57) ABSTRACT

This invention provides a dual usage cache reload buffer (CRB) to hold both demand loads as well as prefetch loads. A new form of a data cache block touch (DCBT) instruction specifies which level of the cache hierarchy to prefetch data into. A first asynchronous form of a DCBT instruction is issued to prefetch a stream of data into a L2 cache. A second synchronous form of a DCBT instruction is used to prefetch data from the L2 cache to the CRB in the main CPU, which will bypass the L1 data cache and forward data directly to the register file. This CRB has a dual usage and is used to hold both normal cache reloads as well as the aforementioned prefetched cache lines.

7 Claims, 5 Drawing Sheets

DATA STREAMING MECHANISM IN A MICROPROCESSOR

BACKGROUND OF THE INVENTION

1. Field of the Invention

The invention relates generally to digital electronic circuitry and, more particularly, to a data prefetch mechanism for different type of workloads in a microprocessor.

2. Description of the Related Art

A known technique to increase processor performance is to layer a memory subsystem into several levels of memory known as caches. The caches nearest the main central processing unit (CPU) are typically small and fast. The caches further away from the main CPU get larger and slower.

Another known technique to improve processor performance is to prefetch data into a cache that is closest to the main CPU. This technique helps eliminate latency for fetching data from a remote cache or memory. Many instruction set architectures have added instructions used to prefetch data from a memory into the processor's cache hierarchy. If software can predict far enough in advance the memory locations that a program will subsequently use, these instructions can be used to effectively eliminate the cache miss latency.

One way of providing software prefetching has been classified as synchronous, software-directed prefetching. The prefetching is considered synchronous, when the prefetch hint usually specifies a small amount of memory, such as a single cache line. Also the instruction can be executed in program order like any other load instruction. Instructions called data cache block touch (DCBT) in the PowerPC™ architecture are examples of synchronous prefetch instructions.

Another instruction class of prefetch instructions is considered asynchronous, when the instructions can specify a very large amount of memory to be prefetched in increments of cache line units. A stream controller can be used to run independently of normal load and store instructions.

There are certain workloads that can most effectively take advantage of prefetch software and hardware techniques. One type of such workloads in microprocessor systems is referred to as streaming data. In this type of workload, large amounts of data are streamed into the core microprocessor. This data is often used for a one-time computation and then transferred back out. This would be common for a graphics type workload. Quite often, a working set of such streaming data is much larger than the capacity of the Level 1 (L1) cache. Also, the data quite often only gets used one time.

Previous streaming mechanisms have used hardware intensive data prefetch mechanisms to stream data into the L1 Cache. These schemes involve extensive additional hardware to detect streams and prefetch ahead of demand loads. Also, when data is streamed into the L1 cache, it often displaces other useful data in the cache.

Therefore, there is a need for a mechanism for providing different data prefetch schemes for different type of workloads.

SUMMARY OF THE INVENTION

The present invention provides a method for prefetching data in a microprocessor. The microprocessor has a cache hierarchy, which includes a cache reload buffer (CRB), an L1 cache, and an L2 cache. The method includes prefetching a stream of data into the L2 cache by using an asynchronous form of a data cache block touch (DCBT) instruction. The method also includes prefetching the data from the L2 cache directly to the CRB without storing the data in the L1 cache by using a synchronous form of a DCBT instruction. Additionally, the method includes retrieving the data from the CRB for processing.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded by a computer program product to perform such functions, unless indicated otherwise.

Figure 1:
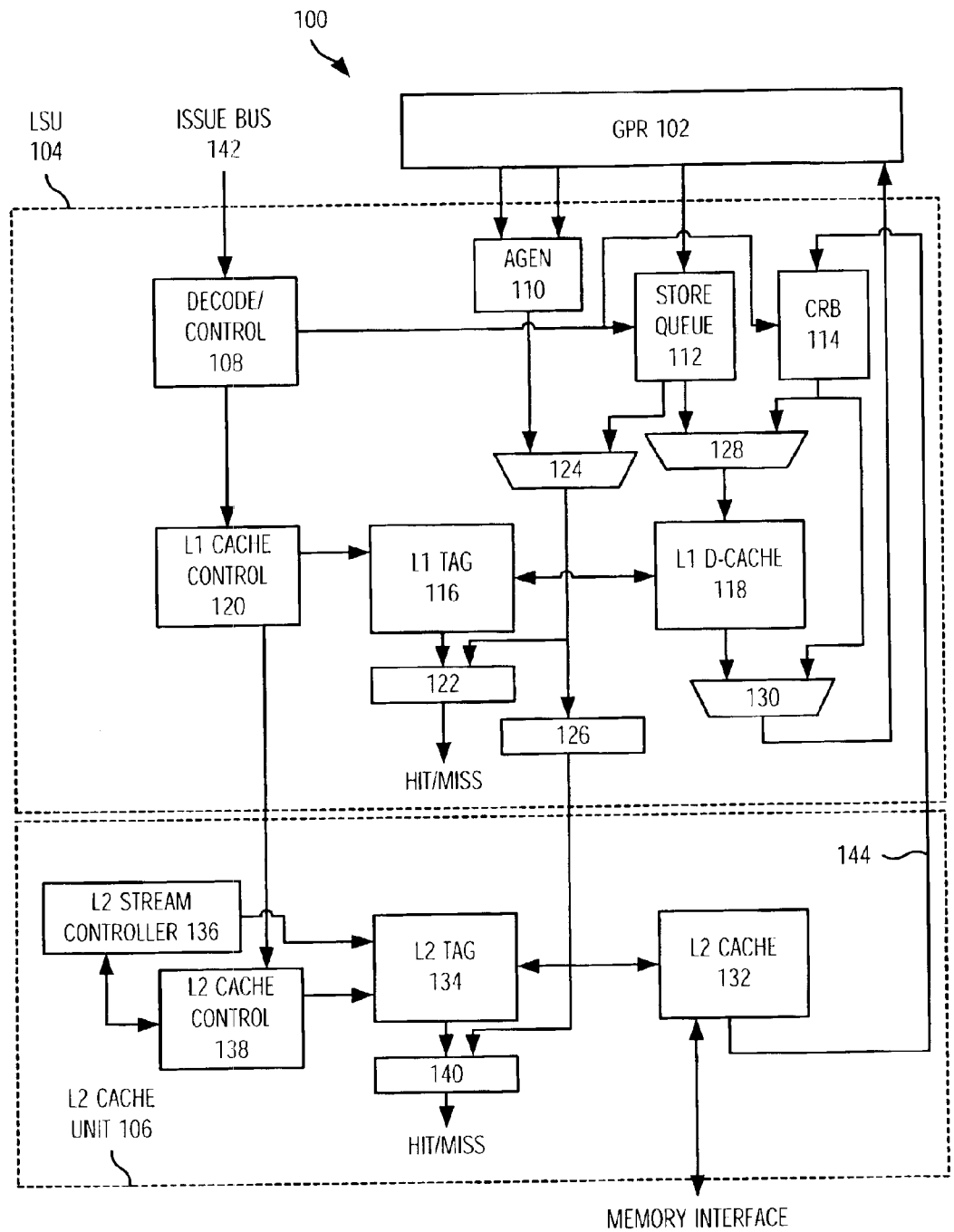
FIG. 1 is a block diagram illustrating a preferred embodiment of data streaming hardware implemented in a microprocessor.

Referring to FIG. 1 of the drawings, a reference numeral 100 generally designates data streaming hardware embodying features of the present invention. The data streaming hardware 100 may be implemented in a microprocessor system (not shown). Preferably, Such a microprocessor system includes a PowerPC™ microprocessor, which operates according to Reduced Instruction Set Computing (RISC) techniques.

The data streaming hardware 100 comprises a general-purpose register file (GPR) 102, a load/store unit (LSU) 104, and an L2 cache unit 106. The LSU 104 comprises a decode/control block 108, an address generation (AGEN) block 110, a store queue 112 for buffering store data and addresses, a cache reload buffer (CRB) 114, an L1 data tag (L1 D-tag) 116, an L1 data cache (L1 D-cache) 118, an L1 cache control block 120, a L1 Tag compare block 122, a first multiplexer 124, a register (collection of latch elements) 126, a second multiplexer 128, and a format multiplexer 130. The L2 cache unit 106 comprises an L2 cache 132, an L2 tag 134, an L2 stream controller 136, a L2 cache control block 138, and a L2 Tag compare block 140. An Instruction Fetch Unit (not shown) fetches instructions from an L1 I-cache (not shown) and issues the instructions to the LSU on an issue bus 142. The decode/control block 108 receives instructions from the issue bus 142, decodes the instructions, and generates control signals for the dataflow of the LSU 104.

The AGEN block 110 receives register source values RA and RB from the GPR 102 and performs an addition operation of the register source values RA and RB, thereby generating an effective address (EA). For normal load instructions, the EA is used to address the L1 D-tag 116 and the L1 D-cache 118. The L1 D-tag 116 along with the L1 tag compare block 122 indicates if the load address hits or misses in the L1 D-cache 118. The store queue 112 is used during the operation of normal store instructions. The store queue 112 receives data from the GPR 102 and queues write requests to the L1 D-cache 118.

The CRB 114 is used to hold multiple cache lines, which are fetched from the L2 cache 132 via an L2 cache line bus 144. For normal demand loads, the cache line received from the L2 cache 132 is written into the CRB 114. The CRB 114 then arbitrates with the store queue 112 to perform a write operation to the L1 D-cache 118. For example, this may be implemented in a simple arbitration scheme in which the CRB 114 always has the highest priority. For prefetch loads, the cache line received from the L2 cache 132 via the L2 cache line bus 144 is written into the CRB 114. The CRB 114 then forwards the data to the GPR 102 via the format multiplexer 130 and bypasses the L1 D-cache 118. When the data is returned from the L2 cache, a control bus (not shown) indicates whether the data is for a demand fetch or a prefetch.

The L2 cache 132 holds both data and instruction cache lines. The L2 tag 134 as well as the L2 tag compare block 140 is used to indicate if the cache address hits or misses in the L2 cache. The L2 cache control block 138 controls L2 cache read and write operations. The L2 stream controller 136 controls the asynchronous data prefetch operations. The stream controller holds an address and byte count for each active stream. When a prefetch command comes from the LSU 104, it specifies the initial address and the number of bytes to fetch. The L2 stream controller 136 fetches the number of bytes specified in the original instruction by going to memory and fetching one cache line at a time up to the maximum byte count.

In this description, "synchronous" refers to operations that are part of the normal instruction flow of a microprocessor, and "asynchronous" refers to operations that are initiated and run independent from the normal instruction flow.

Figure 2:
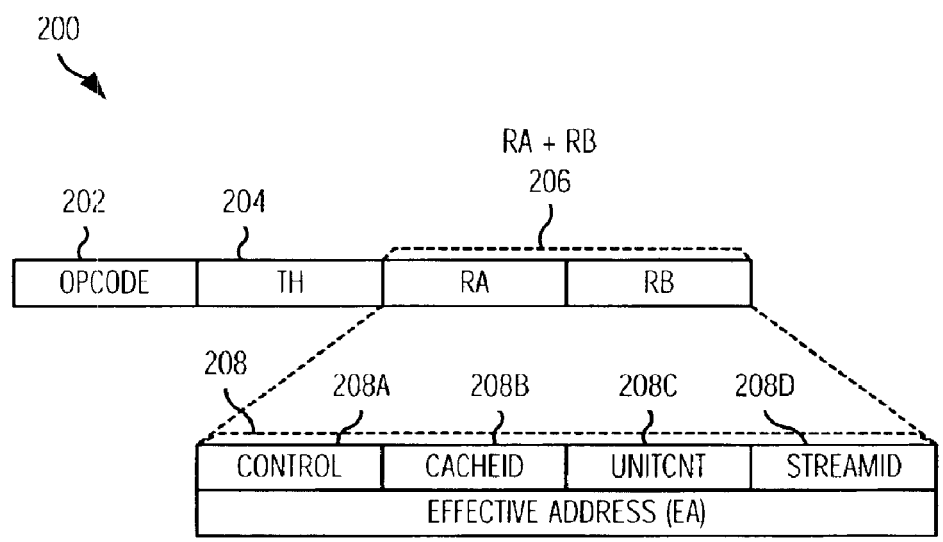
FIG. 2 depicts a new form of data cache block touch (DCBT) instruction.

Now referring to FIG. 2, a data cache block touch (DCBT) instruction 200 is shown according to the present invention. The DCBT instruction 200 comprises an OPCODE field 202, a TH field 204, and an RA/RB field 206. The OPCODE field 202 specifies the operation to be initiated. The TH field 204 specifies whether the DCBT instruction 200 is a normal touch or an enhanced touch. The RA/RB field 206 contains GPR locations, which are used to form the Effective Address (EA). The contents of the registers specified by the RA/RB field 206 are added together (RA+RB) in the LSU to form an EA. The EA can be used as a memory address location in which to store prefetch date. For the DCBT instruction 200, the EA can also form a new control word 208. The control word 208 has four control fields. The four control fields include a CONTROL field 208A, a CACHEID field 208B, a UNITCNT field 208C, and a STREAMID field 208D. The CONTROL field 208A specifies start/stop conditions. The CACHEID field 208B specifies the cache level to prefetch the data into. For example a two bit encoding would have the following meaning:

| 00 | L0 cache | (CRB) |
|----|----------|-------|
| 01 | L1 cache |       |
| 10 | L2 cache |       |
| 11 | L3 cache |       |

The UNITCNT field 208C specifies the number of cache lines to prefetch. The STREAMID field 208D specifies which stream to start.

In the DCBT instruction 200, the cache level to prefetch the data into is specified, from L3 cache all the way down to L0 cache. The L0 cache in this scheme is the dual use CRB 114. Preferably, software will initiate the DCBT instruction 200 to prefetch multiple cache lines into the L2 cache 132. Software will then initiate the DCBT instruction 200 to prefetch individual cache lines into the L0 cache, which is the CRB 114.

Figure 3A:
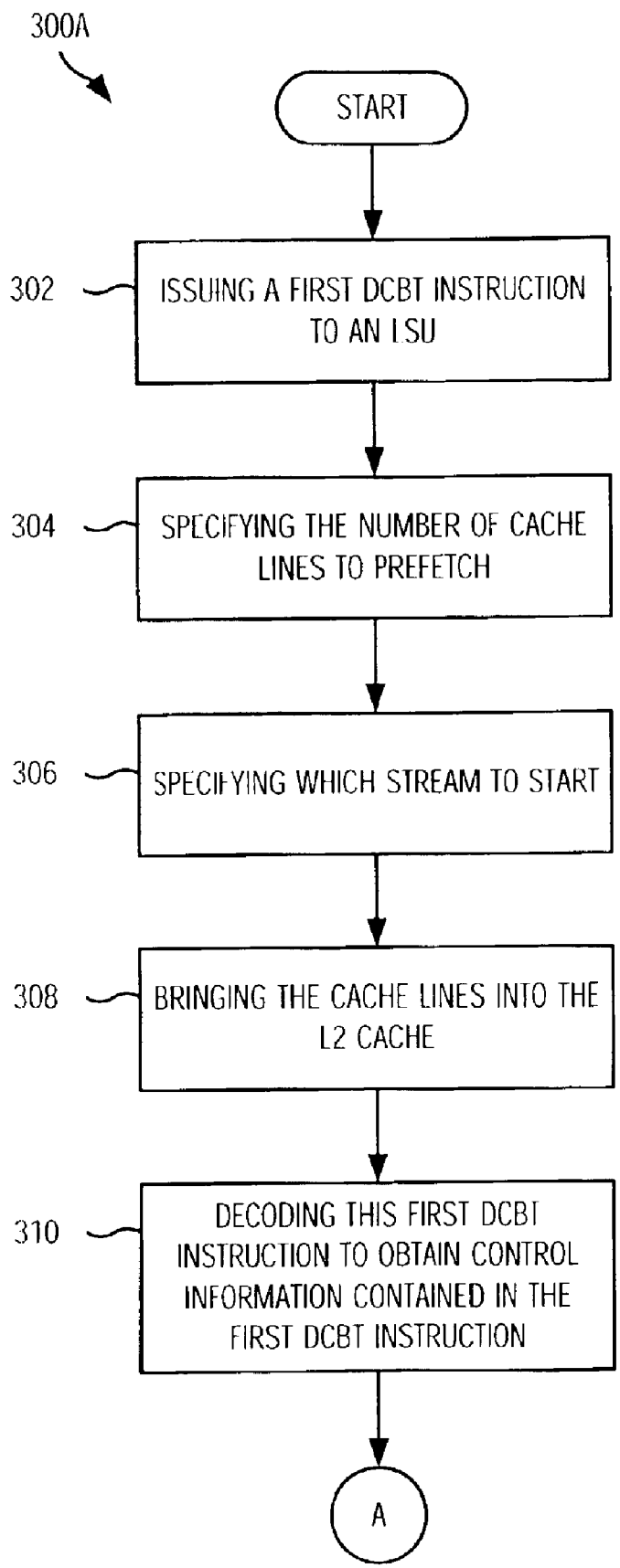
FIG. 3A is a flow diagram illustrating an asynchronous prefetch operation of a streaming transaction.
Figure 3A:
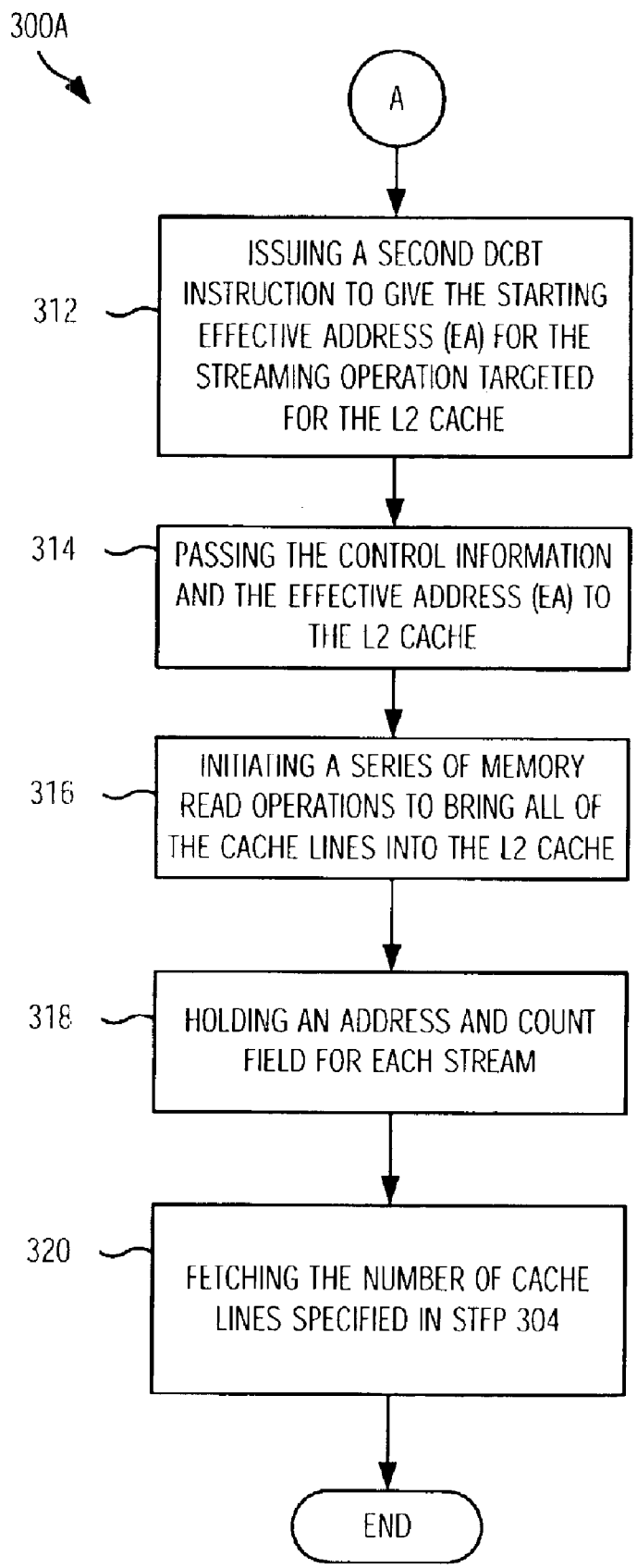

In FIG. 3A, a flow diagram illustrates an asynchronous prefetch operation 300A of a streaming transaction according to the present invention. In step 302, an instruction unit issues a first DCBT instruction to an LSU. The first DCBT instruction is used to indicate that a streaming operation into an L2 cache is to be performed. In step 304, the UNITCNT field 208C specifies the number of cache lines to prefetch. In step 306, the STREAMID field 208D specifies which stream to start. In this step, the cache level to prefetch the data into is specified, from L3 cache all the way down to L0 cache. Preferably, the L0 cache in this scheme is a dual use CRB. Software will initiate a DCBT instruction to prefetch individual cache lines into the L0 cache (i.e., the CRB). In step 308, the CACHEID field 208B brings the cache lines into the L2 cache. In step 310, the LSU decodes this first DCBT instruction to obtain control information contained in the first DCBT instruction. In step 312, a second DCBT instruction is issued to give the starting effective address (EA) for the streaming operation targeted for the L2 cache. In step 314, the LSU also passes the control information and the effective address (EA) to the L2 cache. In step 316, an L2 stream controller then initiates a series of memory read operations to bring all of the cache lines into the L2 cache. In step 318, the L2 stream controller holds an address and count field for each stream. In step 320, the L2 stream controller fetches the number of cache lines specified in step 304.

Figure 3B:
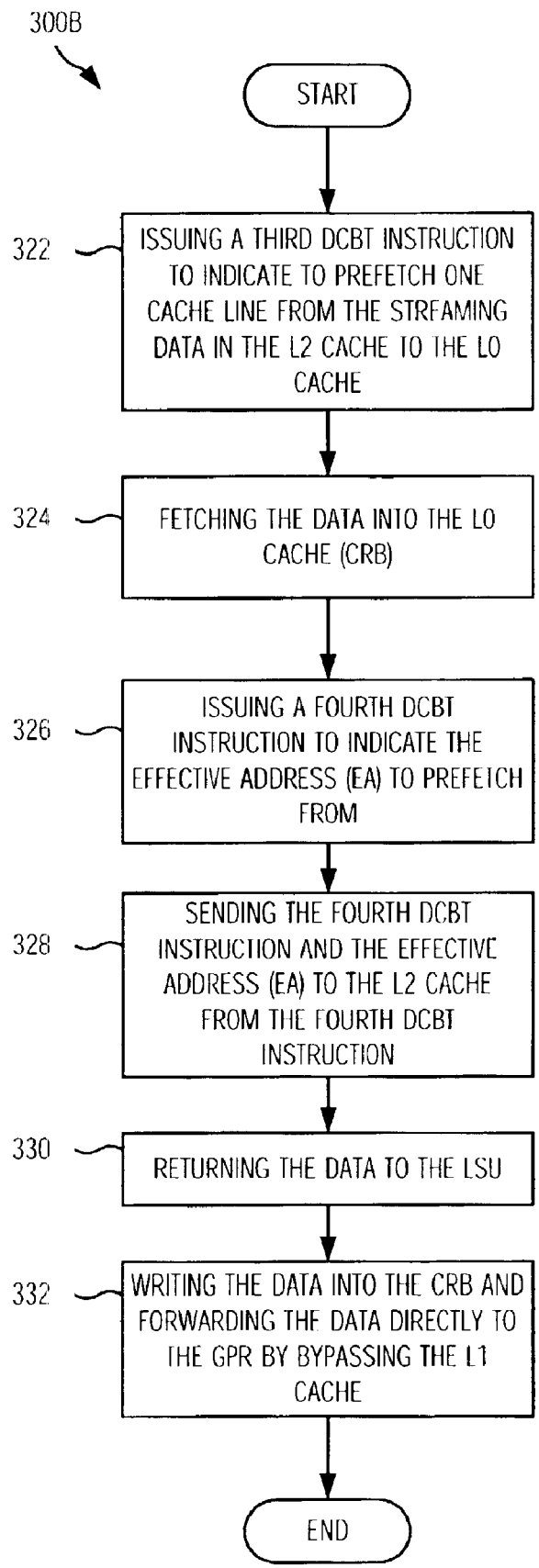
FIG. 3B is a flow diagram illustrating a synchronous prefetch operation of a streaming transaction.

Now referring to FIG. 3B, a flow diagram illustrates a synchronous prefetch operation 300A of a streaming transaction according to the present invention. In step 322, a third DCBT instruction is issued, which indicates to prefetch one cache line from the streaming data in the L2 cache to the L0 cache. In step 324, the CACHEID 208B fetches the data into the L0 cache (CRB). In step 326, a fourth DCBT instruction is issued, which indicates the effective address (EA) to prefetch from. In step 328, the LSU sends the fourth DCBT instruction and the effective address (EA) to the L2 cache from the fourth DCBT instruction. In step 330, the L2 cache then returns the data to the LSU. The data is returned in the form of cache lines. A cache is organized as multiple cache lines. For example, a typical cache line would be 32 bytes to 128 bytes. In step 332, the LSU writes the data into the CRB and forwards the data directly to the GPR by bypassing the L1 cache.

Subsequent demand loads issued to the LSU will perform an address comparison with the addresses in the CRB as well as the L1 D-tag and check for a hit. The flow of normal demand loads and their associated address compares are synchronous to the instruction stream. If there is a hit in the CRB, the data will be forwarded directly from the CRB to the register file. Note that a hit means the address was located.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. A method for prefetching data in a microprocessor having a cache hierarchy, the cache hierarchy comprising a cache reload buffer (CRB), an L1 cache, and an L2 cache, the method comprising the steps of:

prefetching a stream of data into the L2 cache by using an asynchronous form of a data cache block touch (DCBT) instruction;

prefetching the data from the L2 cache directly to the CRB without storing the data in the L1 cache by using a synchronous form of a DCBT instruction; and retrieving the data from the CRB for processing.

2. The method of claim 1, wherein the CRB has a dual usage and is used to hold both normal cache reloads and prefetched cache lines.

3. A computer program product for prefetching data in a microprocessor having a cache hierarchy, the cache hierarchy comprising a cache reload buffer (CRB), an L1 cache, and an L2 cache, the computer program product having a medium with a computer program embodied thereon, the computer program comprising:

computer program code for prefetching a stream of data into the L2 cache by using an asynchronous form of a data cache block touch (DCBT) instruction;

computer program code for prefetching the data from the L2 cache directly to the CRB without storing the data in the L1 cache by using a synchronous form of a DCBT instruction; and computer program code for retrieving the data from the CRB for processing.

4. The computer program product of claim 3, wherein the CRB has a dual usage and is used to hold both normal cache reloads and prefetched cache lines.

5. A microprocessor comprising:

a cache reload buffer (CRB);

an L2 cache coupled to the CRB, the CRB being configured for receiving one or more cache lines from the L2 cache, wherein a stream of data is prefetched into the L2 cache by using an asynchronous form of a data cache block touch (DCBT) instruction;

an L1 cache coupled to the CRB, the CRB being configured for writing normal demand loads to the L1 cache and for bypassing the L1 cache for prefetch loads, wherein the data from the L2 cache is prefetched directly to the CRB without storing the data in the L1 cache by using a synchronous form of a DCBT instruction; and a general-purpose register file (GPR) coupled to the CRB for retrieving the data from the CRB for processing.

6. The microprocessor of claim 5, wherein the CRB has a dual usage and is used to hold both the normal demand loads and the prefetch loads.

7. The microprocessor of claim 5, further comprising:

a format multiplexer coupled to the CRB and the L1 cache for receiving the normal demand loads from the L1 cache and for receiving the prefetch loads from the CRB, the format multiplexer being coupled to the GPR to send the normal demand loads and the prefetch loads to the GPR.

* * * * *